US012101661B2

(12) United States Patent
Watfa et al.

(10) Patent No.: US 12,101,661 B2
(45) Date of Patent: Sep. 24, 2024

(54) METHOD AND APPARATUS FOR RELAY OPERATION IN WIRELESS COMMUNICATION SYSTEM

(71) Applicant: Samsung Electronics Co., Ltd., Suwon-si (KR)

(72) Inventors: Mahmoud Watfa, Staines (GB); Mehrdad Shariat, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 17/399,568

(22) Filed: Aug. 11, 2021

(65) Prior Publication Data

US 2022/0086682 A1   Mar. 17, 2022

(30) Foreign Application Priority Data

Aug. 11, 2020  (GB) ..................................... 2012511
Aug. 9, 2021   (GB) ..................................... 2111471

(51) Int. Cl.
| *H04W 28/00* | (2009.01) |
| *H04W 28/02* | (2009.01) |
| *H04W 28/24* | (2009.01) |
| *H04W 72/23* | (2023.01) |
| *H04W 72/53* | (2023.01) |

(Continued)

(52) U.S. Cl.
CPC ....... *H04W 28/0268* (2013.01); *H04W 28/24* (2013.01); *H04W 72/23* (2023.01); *H04W 72/53* (2023.01); *H04W 72/542* (2023.01); *H04W 76/15* (2018.02)

(58) Field of Classification Search
None
See application file for complete search history.

(56) References Cited

U.S. PATENT DOCUMENTS

2018/0324631 A1\* 11/2018 Jheng .................... H04L 5/0055
2020/0322834 A1\* 10/2020 Huang-Fu ......... H04W 28/0268
2021/0014721 A1\*  1/2021 Youn .................... H04W 28/24
(Continued)

FOREIGN PATENT DOCUMENTS

WO    2018/070689 A1    4/2018
WO    2019/161269 A1    8/2019

OTHER PUBLICATIONS

Samsung, "KI#3, New Sol: QoS handling for Remote UE", S2-2003786, SA WG2 Meeting #139E, Elbonia, May 22, 2020, section 6.X.
(Continued)

*Primary Examiner* — Abdelillah Elmejjarmi
(74) *Attorney, Agent, or Firm* — Jefferson IP Law, LLP

(57) ABSTRACT

A method for supporting end-to-end (e2e) Quality of Service (QoS) for uplink (UL) communication between a User Equipment (UE) and a network via a relay node, the method performed by the relay node, are provided. The method includes receiving, from the network, a downlink (DL) packet for the UE, wherein the DL packet includes a value of a first indicator of a QoS flow on a first link between the relay node and the network, and creating or updating a QoS rule, wherein the QoS rule is derived based on the value of the first indicator, and optionally wherein the created or updated QoS rule corresponds to the UE or to a QoS flow on a second link with the UE.

15 Claims, 10 Drawing Sheets

(51) Int. Cl.
*H04W 72/542* (2023.01)
*H04W 76/15* (2018.01)

(56) References Cited

U.S. PATENT DOCUMENTS

2021/0037593 A1* 2/2021 Pan ................. H04W 76/27
2023/0035965 A1* 2/2023 Ahmad .............. H04W 4/025

OTHER PUBLICATIONS

Qualcomm Incorporated, "KI#3, New solution to support end-to-end QoS for Layer-3 UE-to-Net work Relay", 82-2004728, SA WG2 Meeting #139E (e-meeting), Elbonia, Jun. 13, 2020 section 6.x.1.
Intel, "KI#3 and 8, New Solution: Generic Authorization for 5G ProSe UE-to-Network Relay service", S 2-2004748, SA WG2 Meeting #139E, Electronic, Jun. 14, 2020 section 6.X.2.
Oppo, "KI#3, New Sol: QoS handling for Layer-3 UE-to-Network Relay", S2-2004729, 3GPP SA WG2 Meeting #139E, Elbonia, Jun. 12, 2020 section 6.X.
International Search Report dated Nov. 12, 2021, issued in International Application No. PCT/KR2021/010640.
Ericsson et al. "3GPP Draft, vol. SA WG2 Meeting #138E, V2X Service Type" S2-2003428, Apr. 25, 2020.
United Kingdom Intellectual Property Office Combined Search and Examination Report dated Aug. 11, 2022, issued In United Kingdom Application No. GB2111471.5.
Extended European Search Report dated Jan. 22, 2024; European Appln. No. 21856218.9-1215 / 4197223 PCT/KR2021010640.

* cited by examiner

METHOD AND APPARATUS FOR RELAY OPERATION IN WIRELESS COMMUNICATION SYSTEM

CROSS-REFERENCE TO RELATED APPLICATION(S)

This application is based on and claims priority under 35 U.S.C. § 119(a) of a United Kingdom patent application number 2012511.8, filed on Aug. 11, 2020, in the United Kingdom Intellectual Property Office, and of a United Kingdom patent application number 2111471.5, filed on Aug. 9, 2021, in the United Kingdom Intellectual Property Office, the disclosure of each of which is incorporated by reference herein in its entirety.

BACKGROUND

1. Field

The disclosure relates to methods, apparatus and systems for reflective Quality of Service (QoS) for User Equipment (UE) to network relay. More particularly, the disclosure relates to methods, apparatus and systems for reflective QoS for UE to network relay in 3$^{rd}$ generation partnership project (3GPP) 5$^{th}$ generation (5G) communication systems.

2. Description of Related Art

To meet the increase in demand with respect to wireless data traffic after the commercialization of 4$^{th}$ generation (4G) communication systems, considerable efforts have been made to develop improved 5$^{th}$ generation (5G) communication systems or pre-5G communication systems. For this reason, 5G communication systems or pre-5G communication systems are called beyond 4G network communication systems or post long term evolution (LTE) systems.

To achieve a high data rate, the implementation of 5G communication systems in an ultra-high frequency band (millimeter wave (mmWave)) (e.g., a 60 gigahertz (GHz) band) is under consideration. To alleviate propagation path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system are being discussed.

Also, in order to improve a system network for 5G communication systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed.

In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As it is possible to provide various services according to the development of mobile communication systems, there is a need for a method of efficiently transmitting and receiving a reference signal in a wireless communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for reflective quality of service (QoS) for a user equipment (UE) to network relay in a wireless communication system.

Additional aspects will be set forth in part in the description which follows and, in part, will be apparent from the description, or may be learned by practice of the presented embodiments.

In accordance with an aspect of the disclosure, a method for supporting end-to-end (e2e) QoS for uplink (UL) communication between a UE (e.g., a remote UE) and a network (e.g., a fifth generation core network (5GC)) via a relay node (e.g., a relay UE) is provided. The method performed by the relay node and includes receiving, from the network (e.g., from a radio access network (RAN)), a downlink (DL) packet for the UE, wherein the DL packet includes a value of a first indicator (e.g., a QoS flow identifier (QFI)) of a QoS flow on a first link (e.g., an access (Uu) link) between the relay node and the network, and creating or updating a QoS rule (e.g., a derived QoS rule), wherein the QoS rule is derived based on the value of the first indicator, and optionally wherein the created or updated QoS rule corresponds to the UE or to a QoS flow on a second link (e.g., a first PC5 link) with the UE.

In accordance with another aspect of the disclosure, a relay node for supporting e2e QoS for UL communication between a UE and a network via the relay node is provided. The relay node includes a transceiver, and at least one processor coupled with the transceiver and configured to receive, from the network, a DL packet for the UE, wherein the DL packet includes a value of a first indicator of a QoS flow on a first link between the relay node and the network, and create or update a QoS rule, wherein the QoS rule is derived based on the value of the first indicator, and optionally wherein the created or updated QoS rule corresponds to the UE or to a QoS flow on a second link with the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
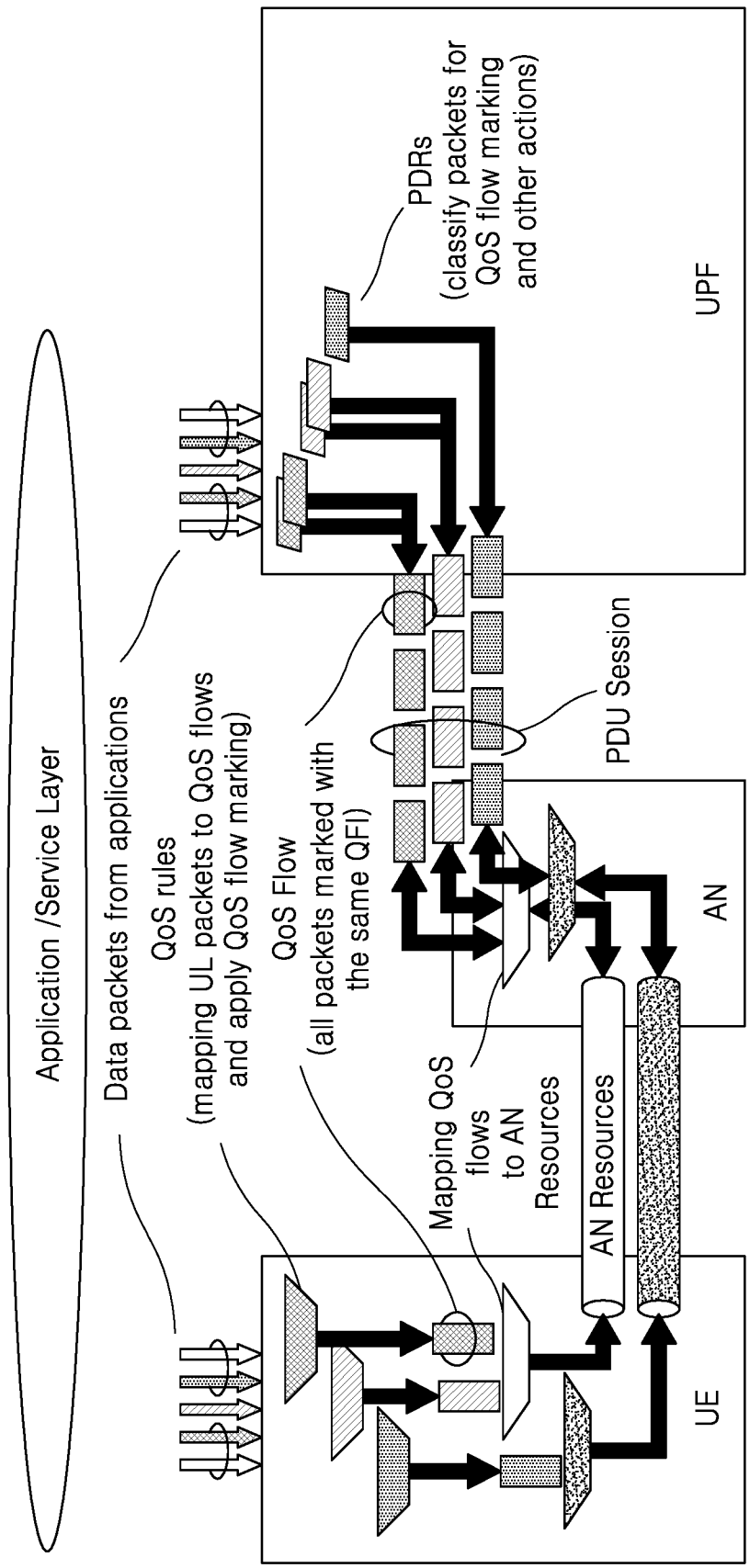
FIG. 1 illustrates a general quality of service (QoS) model in fifth generation system (5GS)-uplink (UL) packet matching and mapping of QoS flows to access network resources according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms as used herein are only used to describe specific embodiments of the disclosure, and are not intended to limit the scope of other embodiments of the disclosure. The singular forms "a," "an," and "the" as used herein may be intended to include the plural forms as well unless the context clearly indicates otherwise. The terms as used herein, including technical or scientific terms, may have the same meanings as commonly understood by those of ordinary skill in the art. Among the terms as used herein, the terms defined in the general dictionary may be interpreted as the meaning identical or similar to the meanings in the context of the related art. Unless explicitly defined in the disclosure, the terms are not interpreted in an ideal or overly formal sense. In some cases, even the terms defined in the disclosure are interpreted to exclude embodiments of the disclosure.

Throughout the description and claims of this specification, the words "comprise," "include" and "contain" and variations of the words, for example "comprising" and "comprises," means "including but not limited to," and is not intended to (and does not) exclude other features, elements, components, integers, processes, operations, functions, characteristics, properties and/or groups thereof.

Throughout the description and claims of this specification, the words "comprise," "include" and "contain" and variations of the words, for example "comprising" and "comprises," means "including but not limited to," and is not intended to (and does not) exclude other features, elements, components, integers, processes, operations, functions, characteristics, properties and/or groups thereof.

In various embodiments of the disclosure described below, a hardware-based approach will be described as an example. However, because various embodiments of the disclosure include technology using both hardware and software, various embodiments of the disclosure do not exclude a software-based approach.

Effects and features of the disclosure, and methods of achieving them will be clarified with reference to embodiments described below in detail with reference to the drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the embodiments of the disclosure to those of ordinary skill in the art. The same reference numerals denote the same elements throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that the respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-executable or computer-readable memory that may direct the computer or other programmable data processing apparatus so as to implement functions in a particular manner, the instructions stored in the computer-executable or computer-readable memory are also capable of producing an article of manufacture containing instruction modules for performing the functions described in the flowchart block(s). Because the computer program instructions may also be embedded into the computer or other programmable data processing apparatus, the instructions for executing the computer or other programmable data processing apparatuses by generating a computer-implemented process by performing a series of operations on the computer or other programmable data processing apparatuses may provide operations for executing the functions described in the flowchart block(s).

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term "module" or "-er/or" as used herein refers to a software element or a hardware element such as field programmable gate array (FPGA) or application specific integrated circuit (ASIC), and the "module" or "-er/or" performs certain functions. However, the term "module" or "-er/or" is not limited to software or hardware. The term "module" or "-er/or" may be configured in an addressable storage medium or may be configured to reproduce one or more processors. Therefore, for example, the term "module" or "-er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the "modules" or "-ers/ors" may be combined with fewer elements and "modules" or "-ers/ors," or may be separated from additional elements and "modules" or "-ers/ors." Furthermore, the elements and the "modules" or "-ers/ors" may be implemented to reproduce one or more central processing units (CPUs) in the device or secure multimedia card. Also, in embodiments of the disclosure, the "module" or "-er/or" may include one or more processors.

In describing the disclosure, when the detailed description of the relevant known functions or configurations is determined to unnecessarily obscure the gist of the disclosure, the detailed description thereof may be omitted. Hereinafter, embodiments of the disclosure will be described in detail with reference to the accompanying drawings.

The term for identifying an access node, the term referring to network entities, the term referring to messages, the term referring to an interface between network entities, the terms referring to a variety of identification information, and the like are exemplified for convenience of description. Therefore, the disclosure is not limited to the terms to be described later, and other terms referring to entities having an equivalent technical meaning may be used.

For convenience of description, the terms and names defined in the 3rd Generation Partnership Project Long Term Evolution (3GPP LTE) standard are used herein. However, the disclosure is not limited by the terms and names and may be equally applied to systems conforming to other standards. The term evolved Node B (eNodeB (eNB)) as used in the disclosure may be used interchangeably with the term next generation NodeB (gNB) for convenience of description. That is, a base station described as the eNB may represent the gNB. Also, the term "terminal" may refer to not only mobile phones, NB-internet of things (IoT) devices, and sensors, but also other wireless communication devices.

Hereinafter, a base station assigns resources to a terminal, and may include at least one of a gNodeB, an eNodeB, a NodeB, a base station (BS), a radio access unit, a base station controller, or a node on a network. Examples of a terminal may include a user equipment (UE), a mobile station (MS), a cellular phone, a smartphone, a computer, a multimedia system capable of performing a communication function, or the like. Of course, the disclosure is not limited to the above examples.

In particular, the disclosure may be applied to 3GPP New Radio (NR) ($5^{th}$ generation (5G) mobile communication standard). Also, the disclosure may be applied to intelligent services (e.g., smart homes, smart buildings, smart cities, smart cars or connected cars, health care, digital education, retail, security and safety related services, etc.) based on 5G communication technologies and IoT related technologies. The term "eNB" as used herein may be used interchangeably with the term "gNB" for convenience of description. That is, a base station described as the eNB may represent the gNB. Also, the term "terminal" may refer to not only mobile phones, NB-IoT devices, and sensors, but also other wireless communication devices.

Also, although long term evolution (LTE), long term evolution-advanced (LTE-A), LTE Pro, or fifth generation (5G) (or NR, next-generation mobile communication) systems are described below as an example, embodiments of the disclosure may also be applicable to other communication systems having a similar technical background or channel form. Also, the disclosure may be applied to other communication systems through some modifications without departing from the scope of the disclosure.

According to an embodiment of the disclosure, the disclosure provides methods, apparatus and systems for reflective quality of service (QoS)(RQoS) for UE to network relay. The following examples are applicable to, and use terminology associated with, 3GPP 5G. However, the skilled person will appreciate that the techniques disclosed herein are not limited to these examples or to 3GPP 5G, and may be applied in any suitable system or standard, for example one or more existing and/or future generation wireless communication systems or standards.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network.

The skilled person will appreciate that the disclosure is not limited to the specific examples disclosed herein. For example:

The techniques disclosed herein are not limited to 3GPP 5G.

One or more entities in the examples disclosed herein may be replaced with one or more alternative entities performing equivalent or corresponding functions, processes or operations.

One or more of the messages in the examples disclosed herein may be replaced with one or more alternative messages, signals or other type of information carriers that communicate equivalent or corresponding information.

One or more further elements, entities and/or messages may be added to the examples disclosed herein.

One or more non-essential elements, entities and/or messages may be omitted in some embodiments.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

According to some embodiments of the disclosure, the disclosure may be provided in the form of an apparatus/device/network entity configured to perform one or more defined network functions and/or a method therefor. Some embodiments of the disclosure may be provided in the form of a system (e.g., a network) comprising one or more such apparatuses/devices/network entities, and/or a method therefor.

Herein, the following documents are referenced:

[1] 3GPP TS 24.501 V16.5.1
[2] 3GPP TS 23.501 V16.3.0
[3] 3GPP TS 23.752 V0.4.0
[4] 3GPP TS 23.287 V16.3.0
[5] 3GPP TS 24.587 V16.1.0

Various acronyms, abbreviations and definitions used in the disclosure are defined at the end of this description.

In the disclosure, the following acronyms, abbreviations and definitions may be used.

3GPP 3rd Generation Partnership Project
5G 5th Generation
5GC 5G Core
5GCN 5G Core Network
5GS 5G System
5GSM 5G Session Management
5QI QoS on Uu link
AN Access Network
DL DownLink
DRB Data Radio Bearer
e2e end-to-end
ID Identity/Identification
IE Information Element
IP Internet Protocol
L2 Layer 2
N1 mode a mode of a UE allowing access to the 5G core network via the 5G access network
NAS Non-Access Stratum
NB NarrowBand
NR New Radio
PC5 Direct communication link between capable ProSe UEs
PC5-S PC5 Signaling
PDU Protocol Data Unit
PFI/PQFI PC5 QoS Flow Identifier
PQI PC5 QFI
ProSe Proximity Services
QFI QoS Flow Identifier
QoS Quality of Service
QRI QoS Rule Identifier
RAN Radio Access Network
Rel Release
RQ Timer RQoS Timer
RQI RQoS Indication
RQoS Reflective QoS
SMF Session Management Function
TS Technical Specification
UE User Equipment
UL UpLink
UPF User Plane Function
Uu interface Air interface between terminal and base station/access point
V2X Vehicle-to-Everything
WB WideBand Overview of Signaled and Derived QoS Rules The 5G QoS model is based on QoS flows which is the finest granularity of QoS differentiation in a PDU session. A QoS flow is identified by a QoS flow identifier (QFI). A QoS flow is associated with a QoS rule and optionally other QoS parameters.

In general, there are two types of QoS rules in 5GS-signaled QoS rules and derived QoS rules.

As the name suggests, signaled QoS rules are QoS rules that are signaled or exchanged between the UE and the network (SMF) using 5GS session management (5GSM) messages. Signaled QoS rules indicate, for example, whether a QoS rule is a default QoS rule or a non-default QoS rule, etc. As specified in TS 24.501 [1], each signaled QoS rule contains:

a) an indication of whether the QoS rule is the default QoS rule;
b) a QoS rule identifier (QRI);
c) a QoS flow identifier (QFI);
d) optionally, a set of packet filters; and
e) a precedence value.

The QoS rules and packet filters are used for uplink (UL) user data packet matching for a protocol data unit (PDU) session of IPv4, IPv6, IPv4v6 or Ethernet PDU session type, i.e., the rules and packet filters enable an association between data and a QoS flow such that the data will be treated based on the characteristics of the QoS flow that is identified by a QFI. This is referred to as packet matching that is described later in this section.

On the other hand, derived rules are QoS rules that are not signaled but rather derived on the fly. Derived rules are used by UE's that support reflective QoS (RQoS). A UE that supports RQoS should indicate so by setting the RQoS bit to "Reflective QoS supported" in the 5GSM capability IE of the PDU Session Establishment Request message. RQoS implies that the UE reflects the treatment of UL data packets based on the QoS treatment that was received in the downlink (DL). To do so, the UE derives QoS rules based on the received DL packet (for which RQoS is applicable) and then the UL data will be treated and transmitted based on the derived QoS rule as described next.

For a UE that supports RQoS, the lower layers in the UE may receive a DL packet with a QFI and an RQI (RQoS indication) that indicates that data related to the DL flow is subject to RQoS. The lower layers provide the QFI and RQI to the NAS which in turn derives QoS rules for UL transmission as follows:

a) the QFI of the derived QoS rule is set to the received QFI;
b) the precedence value of the derived QoS rule is set to 80 (decimal); and
c) the packet filter for UL direction of the derived QoS rule is set to the derived packet filter for UL direction.

When the UE derives QoS rules, the UE associates and starts a timer T3583 (referred to as RQ timer) that guards the period of time during which the derived rules are maintained. The value of the timer is either signaled to the UE using 5GSM messages or the UE applies a default value as described in [1].

The UE updates a derived rule as follows (see [1]):

a) the UE shall re-start the timer T3583 associated with the derived QoS rule with the RQ timer value last received during the UE-requested PDU session establishment procedure of the PDU session or the network-requested PDU session modification procedure of the PDU session. If the RQ timer value was received neither in the UE-requested PDU session establishment procedure of the PDU session nor in any network-requested PDU session modification procedure of the PDU session, the default standardized RQ timer value is used, and
b) if the QFI value associated with the DL user data packet is different from the QFI value stored for the derived QoS rule, the UE shall replace the QFI value stored for the derived QoS rule with the new QFI value for the derived QoS rule The conditions for deleting derived QoS rules are indicated below from [1]:

TABLE 1

Upon expiration of timer T3583 associated with a derived QoS rule, the UE shall remove the derived QoS rule.
Upon release of the PDU session, the UE shall remove the derived QoS rule(s) associated with the PDU session.
If the network accepts the request from the UE to revoke the usage of reflective QoS and sets the value of the RQ timer to "deactivated" or zero, the UE shall remove the derived QoS rule(s) associated with the PDU session.
Upon inter-system mobility from WB-N1 mode to NB-N1 mode or from NR connected to 5GCN to NB-N1 mode, the UE shall remove the derived QoS rule(s) associated with the PDU session that is kept active.
When a derived QoS rule is deleted, the timer T3583 associated with the derived QoS rule shall be stopped A UE may have both signaled QoS rules and derived QoS rules. With either or both, the UE uses these rules for uplink packet matching, i.e., to match data to particular QoS flows which then get transmitted and treated according to the QoS profile or characteristics of the QoS flow, e.g., based on the associated QFI.

Packet matching in the UL direction is performed by the UE as indicated below from TS 24.501 [1]:

TABLE 2

For PDU session of IPv4, IPv6, IPv4v6 or Ethernet PDU session type, upon receiving an UL user data packet from the upper layers for transmission via a PDU session, the UE shall attempt to associate the UL user data packet with:
a) the QFI of a signaled QoS rule associated with the PDU session which has a set of packet filters containing a packet filter for UL direction matching the UL user data packet or containing a packet filter for both UL and DL directions matching the UL user data packet; or
b) the QFI of a derived QoS rule associated with the PDU session which has the packet filter for UL direction matching the UL user data packet;
by evaluating the QoS rules in increasing order of their precedence values until the UL user data packet is associated with a QFI or all QoS rules are evaluated.
For PDU session of unstructured PDU session type, upon receiving an UL user data packet from the upper layers for transmission via a PDU session, the UE shall associate the UL user data packet with the QFI of the default QoS rule associated with the PDU session.
If the UL user data packet is associated with a QFI, the UE shall pass the QFI along the UL user data packet to the lower layers for transmission.
NOTE: Marking of the UL user data packet with the QFI is performed by the lower layers.
If all QoS rules are evaluated and the UL user data packet is not associated with a QFI, the UE shall discard the UL user data packet.

After a data packet is matched to a QoS flow, the UE provides the data packet and the QFI of the corresponding QoS flow to which the data packet has been matched. The lower layer in turn performs a mapping of the QoS flow (identified by a QFI) to access network resources, thereby the data packet that has been matched to a QoS flow (identified by a QFI) will be transmitted using the mapped access network resources and hence the transmission will be such that the data packet will get the treatment that is associated with the QFI as per the QoS profile of the flow.

FIG. 1 illustrates a General QoS model in 5GS-UL packet matching and mapping of QoS flows to access network resources according to an embodiment of the disclosure.

Referring to FIG. 1 (from TS 23.501 [2]), it shows the overall QoS model in 5GS, where both UL packet matching and mapping to resources are visually described:

It should be noted that multiple QoS rules can have the same QFI and hence the packets matched based on these different QoS rules will have the same treatment by virtue of the same QFI.

Next, an example of how both signaling and derived QoS rules are used by the UE will be provided.

For the sake of example, assume the UE has a PDU session #1 with two QoS rules that are identified by a QoS rule identifier (QRI) A and QRI B. Assume QRI A is for the default QoS rule while QRI B is for a non-default QoS rule. Assume the precedence value of QRI A is 2 while that of QRI B is 1—this means QRI B is checked before QRI A since lower precedence means higher priority.

Assume, that the PDU session is for type IPv6 and the UE has the following components for a packet filter for the QoS rule identified by QRI B:

Source IP address: IP-Src-Y
Destination IP address: IP-Dst-Z
Source port: #222
Destination port: #333
Next header: "someHeader"

Assume also that the QoS rule identified by QRI B has an associated QFI #20.

It should be noted that the values of the parameters above are just used for an example.

Figure 2:
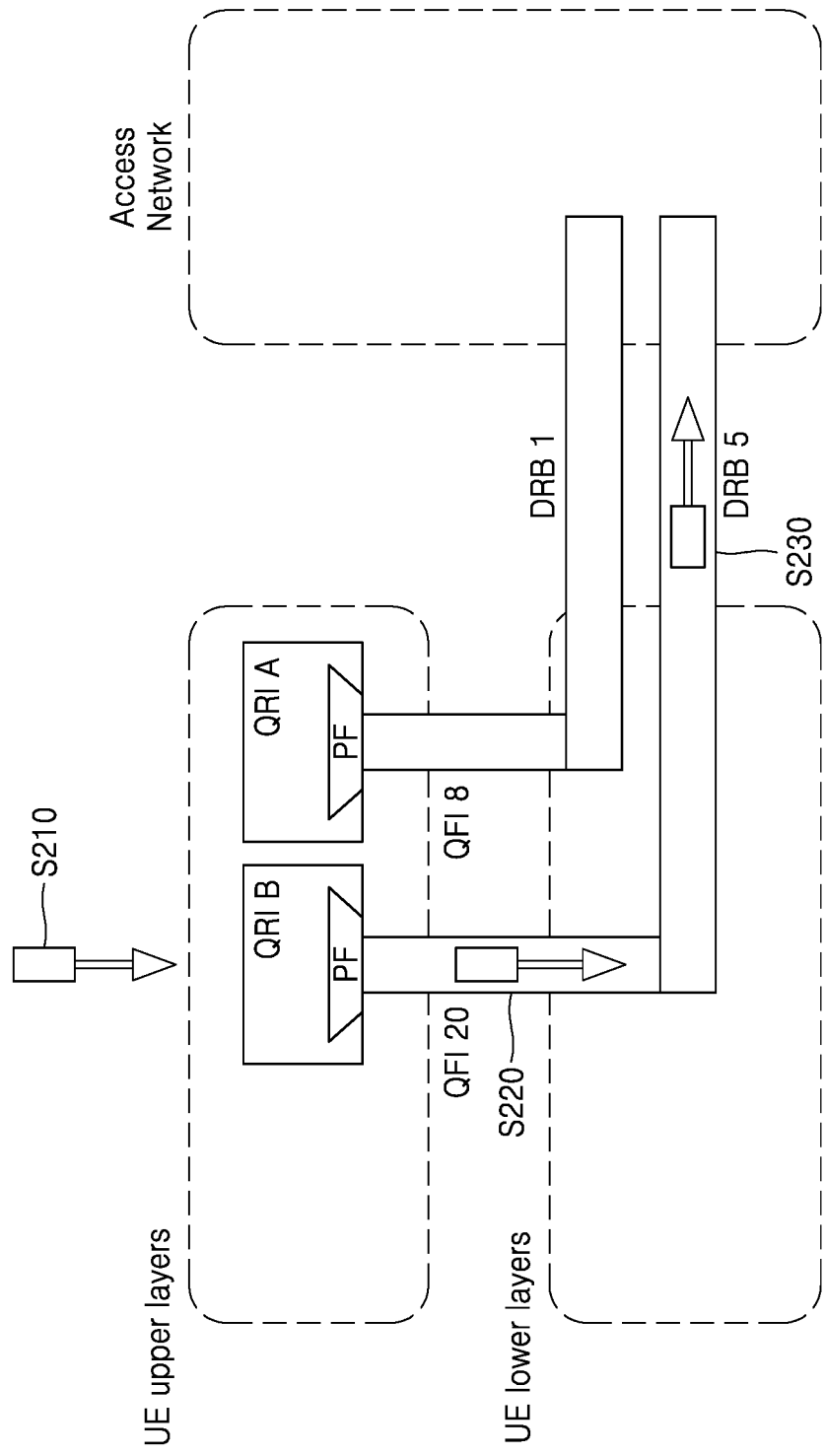
FIG. 2 illustrates an example use case for UL transmission of data following packet matching by upper layers and mapping to a data radio bearer (DRB) by lower layers according to the related art.

FIG. 2 illustrates an example use case for UL transmission of data following packet matching by upper layers and mapping to DRB by lower layers according to the related art.

Referring to FIG. 2, with the above, when the UE has an UL data to be sent, as per operation S210, from the source IP address and port number indicated above, and destined to the destination IP and port number indicated above, and the next header field set to the value indicated above, then the UE will match this UL data to the QoS flow identified by QFI #20 as per operation S220 in FIG. 2. This is because the PF that match the information of the data to be sent are part of QRI B.

The UE then provides the UL data packet to the lower layers and also indicates the QFI to be #20. The lower layer then maps the data associated with a QFI to the corresponding data radio bearer (DRB), in this case DRB 5, as per operation S230 in FIG. 2.

In the DL, the access network (AN) would normally send any corresponding DL packets on DRB 5 when these packets require a QoS treatment according to the QoS profile defined by QFI 20.

The interactions between the AN and the UPF are not shown for simplicity in the FIG. 2.

So far, the above example assumes that the UE has thus far used signaled QoS rules, i.e., QRI A and QRI B.

Figure 3:
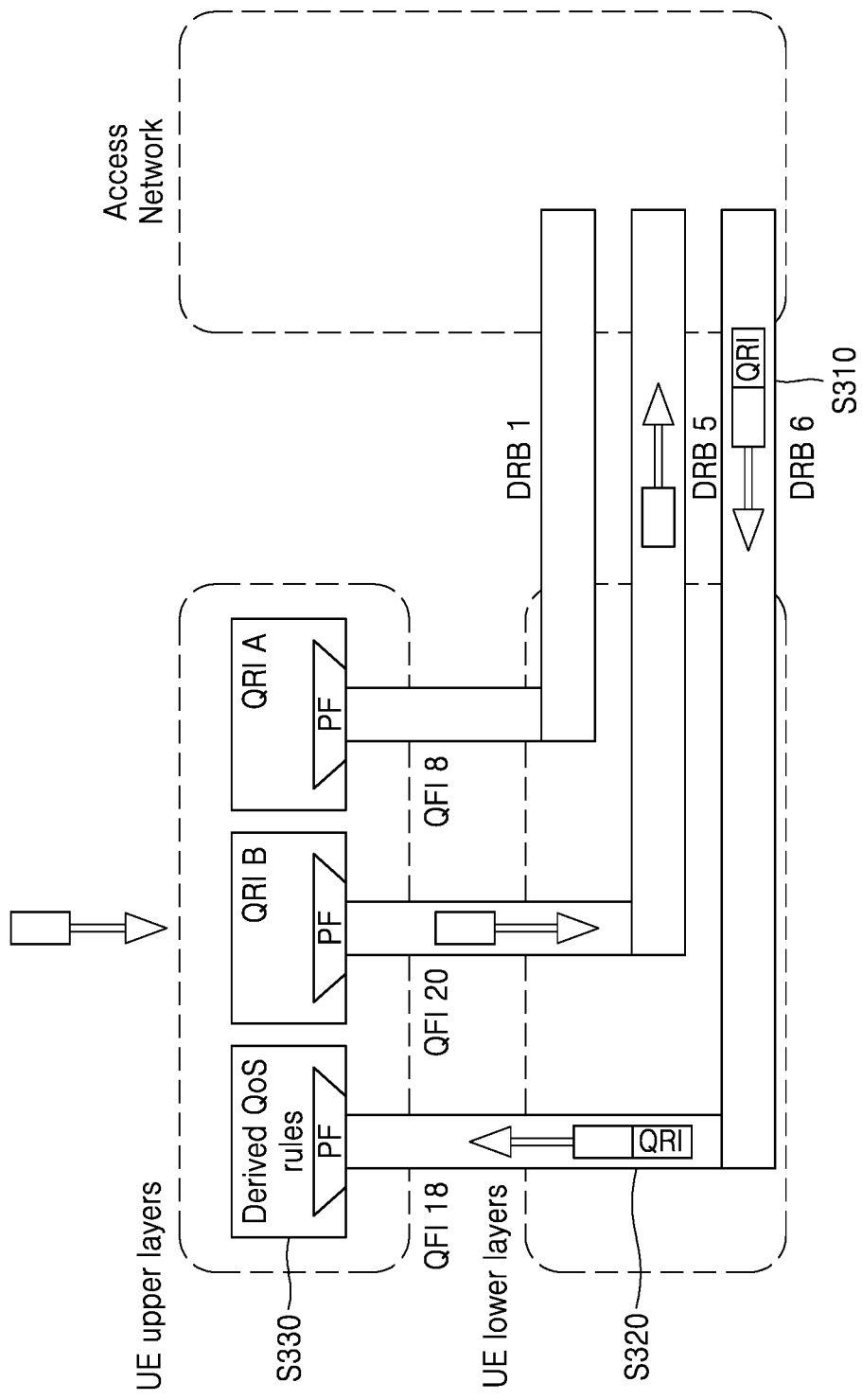
FIG. 3 illustrates an example use case with reflective quality of service (RQoS) and derived QoS rules according to the related art.

FIG. 3 illustrates an example use case with RQoS and derived QoS rules according to the related art.

Referring to FIG. 3, assuming RQoS is applicable to this PDU session, the access network may receive a DL packet with an indication that RQoS should be used for the DL packet (see section 5.7.5.3 in [2]). The AN having determined to use a different QFI for this DL packet will then send the DL packet on DRB 6 and indicate to the UE that RQoS should be applied to this flow as shown in operation S310 in FIG. 3. Although not shown, the AN also indicates to the UE the QFI that needs to be used for the corresponding UL traffic.

It should be noted that this example shows that DRB 6 is used to send DL packets that are to be treated according to a QoS profile that is associated with QFI 18, however it is possible that different QFIs can map to the same DRB. Therefore, it is possible that the DL packet may have a different QFI, e.g., QFI 18, but still use the same DRB, e.g., DRB 5 even if DRB 5 is also used to transmit or receive data associated with QFI 20.

When the lower layers in the UE receive the DL packet and see the RQI indicator, the lower layers pass the packet to the upper layers and in turn provide the RQI and the QFI that should be used for the corresponding UL packets. The RQI indicates that RQoS should be applicable in the UL and the associated QFI is the QFI with which any UL packets should be sent. This is shown in operation S320 in FIG. 3.

Based on the received indications, (the upper layers in) the UE then creates a derived QoS rule and associates and starts a timer T3583 as described in [1]. This is shown in operation S330 in FIG. 3.

Although not shown in FIG. 3, any UL packet, corresponding to the DL packet for which RQI was indicated, will now be associated with QFI 18 until the UE deletes the derived QoS rule, e.g., after T3583 expires.

Overview of 5G Proximity Services (ProSe)

Proximity services (ProSe) for the 5GS are being studied in TR 23.752 [3]. One of the key issues being studied is the support for UE to network relay (hereafter referred to as relay UE) that acts as a means for remote UEs to connect to the 5GS, where the remote UEs are considered to be out of coverage. As such, the remote UEs connect to the relay UE via a direct connection over the air (specifically using the 3GPP New Radio (NR) access technology) and the relay UE acts as a Layer 3 type of relay. There are other proposals for the relay UE to acts as a Layer 2 relay, however this document assumes that the relay UE is actually acting as a Layer 3 relay entity.

The direct communication between any capable ProSe UEs, e.g., between a remote UE and a relay UE, occurs via the so-called PC5 link which is a direct link that uses the NR access. Whereas a relay UE uses the Uu interface to communicate with the network.

Figure 4:
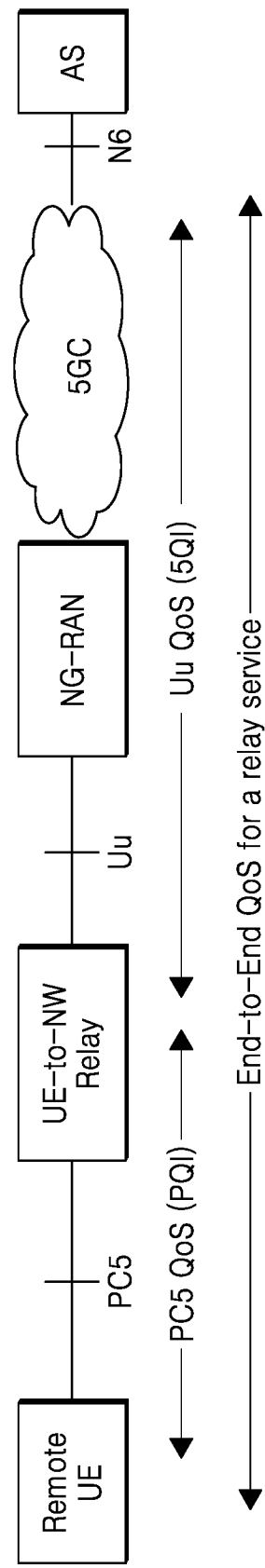
FIG. 4 illustrates communication between a remote user equipment (UE) and a fifth generation core network (5GC) via a relay UE according to the related art.

FIG. 4 illustrates communication between a remote UE and the 5GC via a relay UE according to the related art.

Referring to FIG. 4 (from [3]), it shows an example of a remote UE connecting to the 5G core (5GC) via a relay UE.

Referring to FIG. 3, the communication between the remote UE and the 5GC has to support an end-to-end (e2e) quality of service (QoS) so that the service being used is satisfied with respect to treatment of data packets.

To meet the e2e QoS requirements, the QoS on the PC5 link, i.e., the PQI, has to correspond to a certain QoS on the Uu link, i.e., the 5QI. For example, there should be a certain match between the PQI and the 5QI being used at the corresponding interface so that the e2e service can be met with a certain set of requirement and expectation. Therefore, it can be expected that a change to the QoS level on one link (e.g., on the Uu link) may impact the overall e2e QoS even if the QoS on the PC5 link (i.e., PQI) is unchanged.

The following is described in solution #24 of [3] about the e2e QoS handling for the model referring to FIG. 2:

TABLE 3

As explained above, the UE-to-Network Relay needs to translate the Uu QoS information into the corresponding PC5 QoS parameters in order to achieve the proper end-to-end QoS. Since the Remote UE and the UE-to-Network Relay uses PC5 unicast communication mode, most of the flow level QoS parameters can be directly reused. The only parameter that requires assistance in the translation is the mapping of 5QIs and PQIs. It is therefore necessary that the UE-to-Network Relay to be configured with the proper mapping information Based on the quoted text in Table 3, it is expected that, for a known 5QI on the Uu interface, the relay UE selects a matching QoS level, i.e., PQI, for the PC5 link with the remote UE. To do so, it is also expected that the relay UE has been properly configured with the information that enables it to match a 5QI value to a proper corresponding PQI value such that the e2e communication can be achieved with the expected quality of experience.

Regarding the PC5 link, 5G ProSe will most likely be using existing or similar solutions that are defined for vehicle-to-everything (V2X) communication part of which supports a direct link establishment and modification between, e.g., two vehicles. For example, TS 23.287 [4] describes the different procedures related to PC5 link establishment and modification whereas the details of these related messages can be found in TS 24.587 [5].

Figure 5:
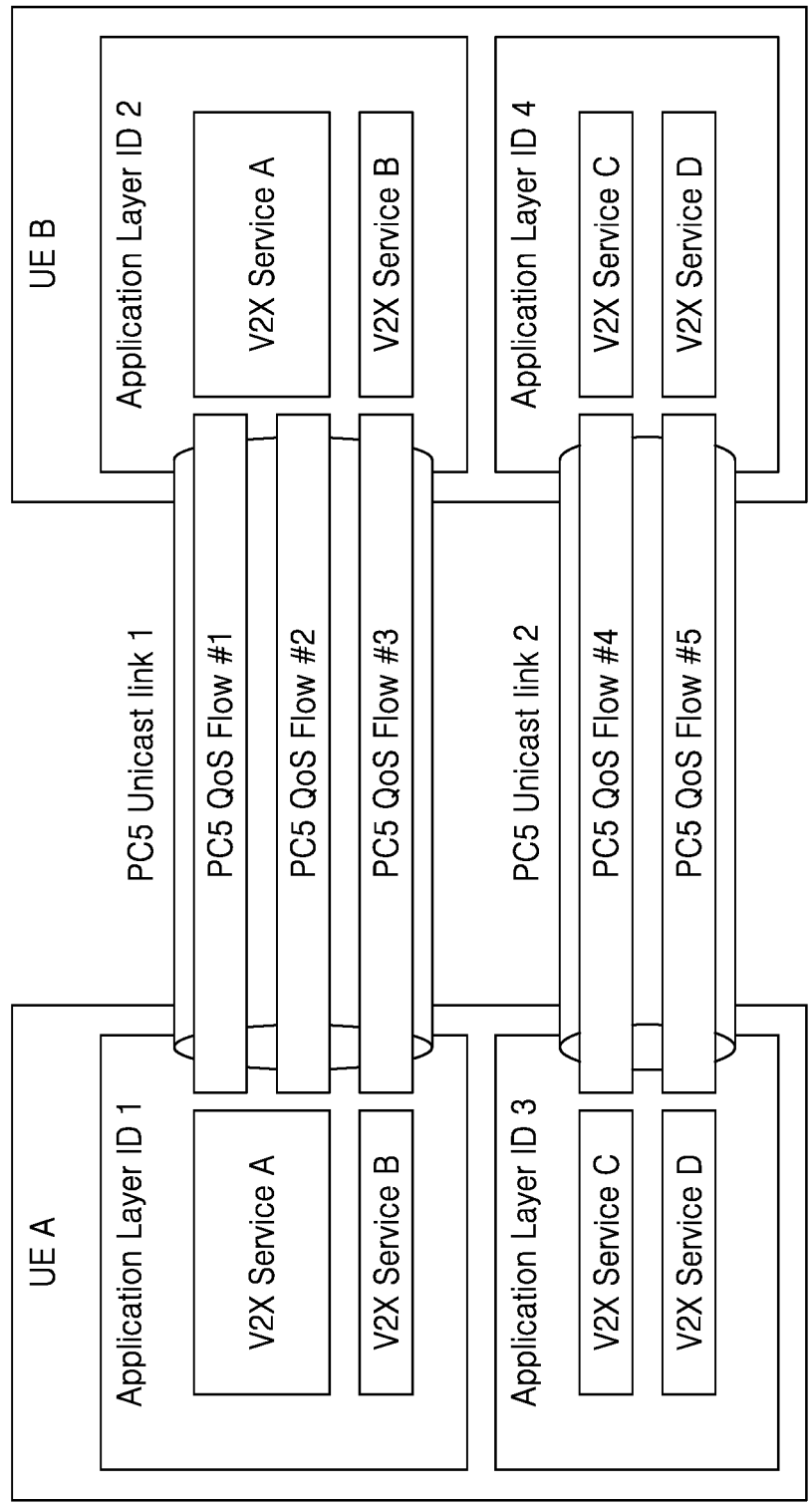
FIG. 5 illustrates an example of two UEs with two PC5 unicast links according to the related art.

FIG. 5 illustrates an example of two UEs with two PC5 unicast links according to the related art.

Referring to FIG. 5 (from [4]), it shows an example of PC5 unicast links that can be established between two UEs.

FIG. 5 assumes that the applications using the PC5 link is for V2X communication, however the PC5 link can also be used for ProSe in Rel-17. Therefore, the example with V2X is for description purposes to understand how the current PC5 link works but should not be seen as a limitation of PC5 communication for V2X services only. The following can be said about the use of PC5 link for V2X communication.

A PC5 unicast link between two UEs allows V2X communication between one or more pairs of peer V2X services in these UEs. All V2X services in the UE using the same PC5 unicast link use the same Application Layer ID.

One PC5 unicast link supports one or more V2X service types if these V2X service types are at least associated with the pair of peer Application Layer IDs for this PC5 unicast link. For example, as illustrated in FIG. 5, UE A and UE B have two PC5 unicast links, one between peer Application Layer ID 1/UE A and Application Layer ID 2/UE B and one between peer Application Layer ID 3/UE A and Application Layer ID 4/UE B.

If multiple V2X service types use a PC5 unicast link, one PC5 QoS Flow identified by PFI (PC5 QoS Flow Identifier, this may also be referred to/abbreviated as PQFI) may be associated with more than one V2X service types.

The above information is presented as background information only to assist with an understanding of the disclosure. No determination has been made, and no assertion is made, as to whether any of the above might be applicable as prior art with regard to the disclosure.

At least the following problem exist in view of the related art:

How Reflective QoS on Uu Link Impacts QoS on PC5 Link is Unspecified

For true support of e2e QoS, a change in QoS on one leg/link of communication would require a change to the QoS on the other leg/link of communication. In particular, the QoS of the Uu link, i.e., between the relay UE and the RAN may change due to the use of RQoS. When this happens, the relay UE may start using a different QFI, and hence QoS treatment, for UL transmissions on the Uu interface. However, the current behavior of such a UE with respect to the QoS to use on the PC5, resulting from using RQoS on the Uu link, is unspecified. This means that a true e2e QoS is not yet specified or supported with RQoS is applied.

Therefore, in summary, the use of RQoS by a relay UE and the impacts to the PC5 link QoS is unspecified.

Some embodiments of the disclosure provide solutions to this problem. For example, in view of the above problems, some embodiments of the disclosure provide one or more of the following solutions.

In some embodiments of the disclosure, a relay UE may adapt the QoS for the PC5 that is used to communicate with a remote UE following the use and applicability of RQoS by the relay UE on UL data that is associated with the remote UE in question. For example, adapting the PC5 QoS between the relay UE and the remote UE may be done by the relay UE according to one or more of:

Modifying the current PC5 link that is established with the remote UE such that a different PC5 QFI (PQI) is used, where this PQI would correspond to the QFI (or 5QI) of the Uu link for which RQoS is used. The corresponding PQI to be used is based on the configuration information in the relay UE.

Within the current PC5 link, using an existing PC5 flow whose PQI corresponds to the QFI (or 5QI) being applied to the Uu link as a result of RQoS.

Creating a new PC5 QoS flow whose PQI corresponds to the QFI (or 5QI) on the Uu link due to RQoS.

Some embodiments of the disclosure are described in more detail below. The skilled person will appreciate that the techniques disclosed herein may be used in any suitable combination.

1. Adapting PC5 QoS Following the Use of RQoS on Uu Link

This solution assumes that the relay UE (i.e., UE to network relay) is configured with the necessary information that contains the mapping between the QoS profile of the Uu link to the QoS profile of the PC5 link. The QoS profile information may be in the form of QFI or PFI for the corresponding links, where each QFI over the Uu is associated with a 5QI and accordingly each PFI over the PC5 link is associated to a PC5 5QI (PQI). For the sake of an example, assume that the relay UE has the following configuration information regarding QFI mapping between QFI on Uu and PFI over PC5:

TABLE 4

| QFI (or 5QI) for Uu Link | PFI (PQI) over PC5 Link |
|---|---|
| A1 (A) | X1 (X) |
| B2 (B) | Y2 (Y) |
| C3 (C) | Z3 (Z) |

Assume that the relay UE is using QFI A1 when sending data in the UL on the Uu link, where the data is for a particular remote UE. As such, the matching PC5 QoS of the flow between the remote UE and the relay UE (i.e., PFI X1) has the PQI X as per the table above.

The relay UE may receive a DL packet on the Uu for the remote UE in question, where the DL packet is accompanied with the RQI bit i.e., indicating that RQoS should be used, and the QFI that should be applied in the UL direction. For the sake of an example, assume that the indicated QFI is B2 associated to 5QI B over Uu.

When this happens, besides the derived QoS rule for the UL Uu, the relay UE may optionally create a PC5 derived QoS rule, where this PC5 derived QoS corresponds to the remote UE in question. To do so, the relay should determine the PQI that corresponds to the indicated 5QI on the DL Uu due to RQoS. The relay UE should use any configuration information to make this determination. The relay UE may locally associate the remote UE in question (or the PC5 QoS flow with the remote UE) to the derived PC5 QoS rule, and/or to a RQoS timer that corresponds to the derived PC5 QoS rule. The association may be done using an identifier for the remote UE such as but not limited to: destination layer 2 ID of the remote UE, PFI, ProSe service ID, Application layer ID, IP address or prefix, etc., or any combination of these identifiers.

The relay UE should then modify either the associated PC5 QoS flow or mapping between Uu and PC5 QoS flows towards the remote UE to match the PQI of the PC5 link/flow to 5QI over Uu (and the indicated QFI over Uu). Going back to the example, the relay UE may then modify the PC5 QoS flow with the remote UE or the mapping such that PQI Y is set, matching to 5QI B for QFI B2, where the latter is to be used as part of RQoS on the Uu link (in the UL direction).

To modify the PC5 QoS flow, due to a different QFI on the Uu, e.g., following the use of RQoS or following the derivation of QoS rules due to RQoS, the relay UE may take any one or more of the following options described below.

Option 1: Modifying the PFI of the Current PC5 QoS Flow with the Remote UE

In this option, the relay UE may modify the PQI of the current PC5 QoS flow with the remote UE to match the Uu level 5QI indicated by (or for) RQoS. For example, this may be done after the relay UE creates derived QoS rules due to RQoS.

The relay UE may send a PC5 message to the remote UE in which the relay UE should identify the PC5 QoS flow in question (e.g., by using a PFI) for which the PQI should be updated. The relay UE should also include the updated PQI for PC5 QoS flow to be used (where this PQI matches the 5QI requirements on the Uu link as indicated by RQoS). The relay UE may also send other types of information in the PC5 message, such as the ProSe service(s) for which this modification is to be applied. The PC5 message that is sent to the remote UE may be a PC5 signaling (PC5-S) message. The PC5-S message may be a new type of message that is defined to modify the characteristics of a PC5 QoS flow, or may be the same as or similar to the Direct link modification request message that is used for V2X communication (for example, see [5]). If the Direct link modification request message is re-used, the relay UE may set the operation to "Modify PC5 QoS parameters of the existing PC5 QoS flow(s)," for example as defined in [5], or a new operation may be defined such as "Modify PC5 QoS parameters of the existing PC5 QoS flow(s) due to RQoS." This new operation may be used if there is a need for the relay UE to inform the remote UE that the changes on PC5 level PQI is based on Uu level 5QI indicated by (or for) RQoS.

If a V2X message is used, e.g., Direct link modification request message, or any other message in [5], for ProSe communication, the "V2X service identifier" field may be set to a new value to indicate that the message is for a ProSe service. Some embodiments of the disclosure may apply to any PC5-S message, for example in [5], and is not necessarily limited to the message to modify a direct link. As such, the relay UE may also identify the particular ProSe service for which the PC5 message is being sent.

The relay UE may behave as disclosed above (e.g., based on Option 1 above) when the relay UE does not have any other existing PC5 QoS flow(s) with the matching PQI to the indicated Uu level 5QI based on RQoS.

Option 2: Using an Existing PC5 QoS Flow Whose PQI Matches the Uu Level 5QI Due to RQoS In this option, the relay UE may verify if there is another existing PC5 QoS flow for which the PQI could be matched to the indicated Uu level 5QI based on RQoS. For example, this may be done after the relay UE creates derived QoS rules due to RQoS.

If such an existing PC5 QoS flow is available, in the above example the PC5 QoS flow will be the one for which the QoS profile has PQI Y (matching 5QI B over Uu), the relay UE may modify the packet filters in PC5 QoS rules in such a way that flow B2 packets over Uu will be directed to PFI Y2 over PC5. In other words, the relay UE may now use this PC5 QoS flow (i.e., with PQI Y in our example) to send the DL data to the remote UE. The relay UE may send a PC5 message to the remote UE, e.g., a PC5-S message, optionally where this message may be a Direct link modification request message (for example, see [5]), to associate the PC5 QoS flow Y2 with the ProSe service it is replacing from flow X1 (if not already associated) and also to optionally remove the associated ProSe service from X1 (if needed). To do so, the relay UE may include a ProSe service identifier that is to be added on the identified QoS flow, i.e., Y2.

Additionally, the relay UE may send a PC5 message to the remote UE, e.g., a PC5-S message, optionally where this message may be a Direct link release request message (for example, see [5]), in order to release the previous QoS flow that was used to exchange data prior to the use of RQoS on the Uu link unless that QoS follow (i.e., X1 in the above example) is still in use with other associated ProSe Services. As such, the relay UE may release the QoS flow (i.e., X1 on the above example) on the PC5 link with the remote UE. Optionally, the relay UE may modify that PC5 link such that the ProSe service that was being used on PC5 flow X1 would be removed. This way, the PC5 QoS flow X1 may be still kept and may be re-used in the future. To re-use the QoS flow in the future, e.g., after deleting PC5 derived QoS rules and re-establishment of the signaled QoS rules, the relay UE may modify the PC5 link (e.g., by sending the relevant PC5 message to the remote UE) to add the ProSe service back on the PC5 QoS flow X1 which means that both the relay UE and remote UE will resume the corresponding ProSe service (i.e., exchange data for the corresponding ProSe service) over the identified QoS flow on the PC5 link.

The relay UE may first modify the PC5 link as disclosed above and then release the other QoS flow (for which the PQI is X, i.e., X1 in the above example) or may take these actions simultaneously or may first release the QoS flow and modify the other as disclosed above, or may take any combination of the proposals above in any order. It is also possible that the relay UE sends one message with one or more operations as disclosed above, i.e., to modify a PC5 link and to release another.

Option 3: Creating a New PC5 QoS Flow Whose PQI Matches the Uu Level 5QI Due to RQoS In this option, the relay UE may create or establish a new PC5 QoS flow on the PC5 link such that the PQI of this new flow would match or correspond to the 5QI of the Uu link due to RQoS. For example, this may be done after the relay UE creates derived QoS rules due to RQoS.

To do so, the relay UE should send a PC5 message to the remote UE, e.g., this may be a PC5-S message, optionally this may be a DIRECT LINK ESTABLISHMENT REQUEST message or a Direct link modification request message (for example, see [5]). The relay UE may include the PQI for this QoS flow where this PQI (in the above example this would be PQI Y for which the PC5 QoS flow ID is Y2) would correspond to the 5QI of the Uu link due to RQoS (in the above example this would be 5QI B).

The relay UE may, in the PC5 message that is sent to the remote UE, indicate the ProSe service that should be used on the PC5 QoS flow.

Additionally, the relay UE may send a PC5 message to the remote UE, e.g., a PC5-S message, optionally where this message may be a Direct link release request message (for example, see [5]), in order to release the previous PC5 QoS flow (i.e., X1 in the above example) that was used to exchange data prior to the use of RQoS on the Uu link. As such, the relay UE may release the PC5 QoS flow on the PC5 link (i.e., X1 in the above example) (and optionally the packet filters in this signaled QoS rule) that was used before deriving QoS rules due to RQoS. Optionally, the relay UE may modify that PC5 link/flow (i.e., X1) such that the ProSe service that was being used on it will now be removed. This way, the QoS flow may be kept and may be re-used in the future. To re-use the QoS flow (i.e., X1 in the above example) in the future, e.g., after deleting derived QoS rules and re-using the signaled QoS rule, the relay UE may modify the PC5 link (by sending the relevant PC5 message to the remote UE) to add the same ProSe service on the QoS flow which means that both the relay UE and remote UE will resume the corresponding ProSe service (i.e., exchange data for the corresponding ProSe service) over the identified QoS flow on the PC5 link (i.e., X1 in the above example).

The relay UE may first create the PC5 link as disclosed above and then release the other (existing) QoS flow (for which the PQI is X, i.e., X1 in the above example), or may take these actions simultaneously, or may first release the QoS flow and create the other as disclosed above, or may take any combination of the techniques disclosed above in any order. It is also possible that the relay UE sends one message with one or more operations as disclosed above, i.e., to create a PC5 link and to release another.

Figure 6:
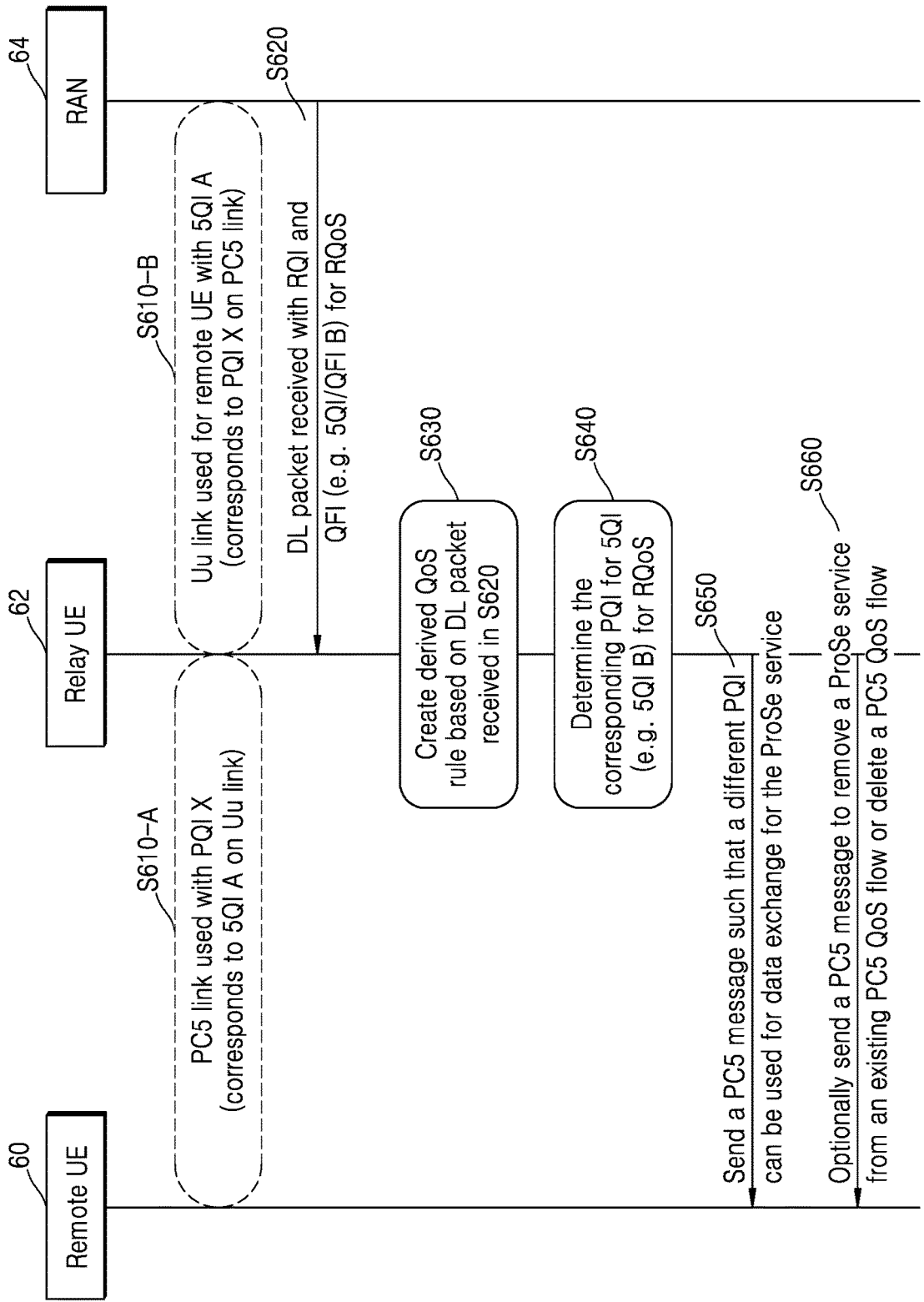
FIG. 6 is a flowchart for transmitting and receiving messages by a relay UE, a remote UE, and a radio access network (RAN) according to an embodiment of the disclosure.

FIG. 6 is a flowchart for transmitting and receiving messages by a relay UE, a remote UE, and a RAN according to an embodiment of the disclosure.

FIG. 6 summarizes the techniques disclosed above for the relay UE 62 and the operations are described below:

Referring to FIG. 6, in operation S610-A, the relay UE 62 may have a PC5 link and PC5 QoS flow with the remote UE 60 for which the PQI is X (i.e., PFI X1). In operation S610-B, the relay UE 62 may have a corresponding Uu level QoS flow with 5QI A (i.e., QFI A1). As such, the ProSe service is run over the PC5 link and the Uu link with PQI X and 5QI A, respectively.

In operation S620, the relay UE 62 may receive from the RAN 64 a DL packet that is for the ProSe service being used by the remote UE 60. The relay UE 62 may receive a DL packet with an indication to apply RQoS (i.e., the RQI bit being set) and the QFI to use with RQoS. In the above example, this QFI (or 5QI) is assumed to be B1 (or 5QI B) (noting that this is just an example).

In operation S630, the relay UE 62 may create a PC5 derived QoS rule for RQoS where this rule is associated with the remote UE 60 in question. The relay UE 62 may locally associate the remote UE 60 in question to the PC5 derived QoS rule using an identifier for the remote UE 60 such as but not limited to: destination layer 2 ID of the remote UE 60, PFI, ProSe service ID, Application layer ID, IP address or prefix, etc., or any combination of these identifiers.

In operation S640, the relay UE 62 may determine the PQI that needs to be used such that this PQI would match the Uu level 5QI for which RQoS is to be used. The determination may use local information (e.g., configuration information) that has a mapping between Uu level 5QI and PC5 level PQI.

In operation S650, the relay UE 62 may send a PC5 message to the remote UE 60 where the message enables the use of the determined PQI (associated with the PC5 QoS flow) such that the PC5 level PQI corresponds to (or matches) the Uu level 5QI as described in operation S640. This PC5 message may be any of the messages disclosed in the different options above. For example, the message may be a request to modify the PQI of a PC5 QoS flow that is used for the ProSe service.

In operation S660, the relay UE 62 may send a PC5 message to the remote UE 60 to stop using a previous PQI for the ProSe service in question (optionally). This request may be in the form of releasing the PC5 QoS flow with the previous PQI or to keep the PC5 QoS flow but removing a ProSe service that was associated to the previous PQI.

The skilled person will appreciate that the operations disclosed above are only examples of how the techniques disclosed herein can be used and are not to be considered as limitations. In addition, the skilled person will appreciate that examples of the disclosure are not limited to the specific operations or the specific order of operations disclosed in the Figures. As such, the skilled person will appreciate that the relay UE may take other actions, and in a different order, and in any combination, other than the specific examples disclosed herein.

The relay UE may continue using the PC5 QoS flow with the determined PQI until the use of RQoS on the Uu link ends. The relay UE may end the use of RQoS on the Uu link in different conditions, such as the expiry of the RQoS timer T3583 or after the derived QoS rule (that is associated to the remote UE) is deleted.

2. Adapting PC5 QoS after Use of RQoS Ends on the Uu Link

The relay UE may stop using RQoS on the Uu link where the RQoS is associated with traffic that is exchanged on a PC5 QoS flow with a remote UE. The relay UE may stop using RQoS when for example the RQoS timer expires.

When the use of RQoS stops, the relay UE may resume back to use the signaled QoS rule (and optionally packet filters associated with the remote UE) on the Uu link for the remote UE traffic. When this occurs, the relay UE may determine again the PC5 level PQI that would correspond to (or match) the QFI (or 5QI) of the signaled QoS rule, e.g., based on configuration information. In the above example, the relay UE may stop using RQoS for which the 5QI is B and resume back to using 5QI A (that is associated with the signaled QoS rule). Hence, the UE accordingly determines to use PQI X over PC5 flow as the match of 5QI A.

Having determined the PQI that should be used as disclosed above, the relay UE may modify the PQI of the QoS flow in use with the remote UE accordingly to PQI X. As such, the relay UE may behave as disclosed in any of the options above, as far as the new PQI matches the 5QI of the signaled QoS rule.

The relay UE may use any of the options disclosed above based on the previous action that the relay had taken to adapt the PC5 QoS when RQoS was used. For example, if the relay UE had modified the existing QoS flow on the PC5 link to use a different PQI, where this PQI would correspond to the 5QI due to RQoS, the relay UE should now again modify the QoS flow on the PC5 link with the remote UE such that the PQI is also changed, and specifically the PQI should be the PQI corresponding to the 5QI of the signaled QoS rule following an end to the use of RQoS. Other options may also be performed by the UE using the appropriate PQI as per the configuration information, where the PQI now corresponds to the 5QI of the signaled QoS rule that is now used after the use of RQoS stops.

3. Triggers to Delete Derived QoS Rules at the Relay UE

The relay UE may delete a PC5 derived QoS rule that is associated with a particular remote UE and/or QoS flow on the PC5 link (where the associated may be based on any of the identifiers disclosed herein) when any one or more of the following occurs:

The associated PC5 QoS flow is deleted (by either the remote UE or the relay UE), The ProSe service that runs over the associated PC5 QoS flow is removed (by either the remote UE or the relay UE), The PC5 link between the remote UE and relay UE is released, The expiry of the RQoS timer T3583 (that is associated to the remote UE) over Uu link.

In the disclosure, the term PFI may also be referred to by PQFI (PC5 QoS Flow Identifier), for example as defined in [5].

Some embodiments of the disclosure enable a true e2e QoS for remote UEs that use a UE to network relay. Some embodiments enable the relay UE to optimize the QoS on the PC5 link such that it matches the QoS of the Uu link that changes when RQoS is applied (or stops to be applied).

Some embodiments of the disclosure may be applied to dynamic QoS handling without dynamic PCC support. In particular, some embodiments do not require any explicit intervention from SMF. This can potentially save on signaling between SMF and Relay UE to frequently modify the relaying PDU session over Uu (e.g., when Uu level 5QI dynamically changes to accommodate AN level Packet Delay Budget changes).

Figure 7:
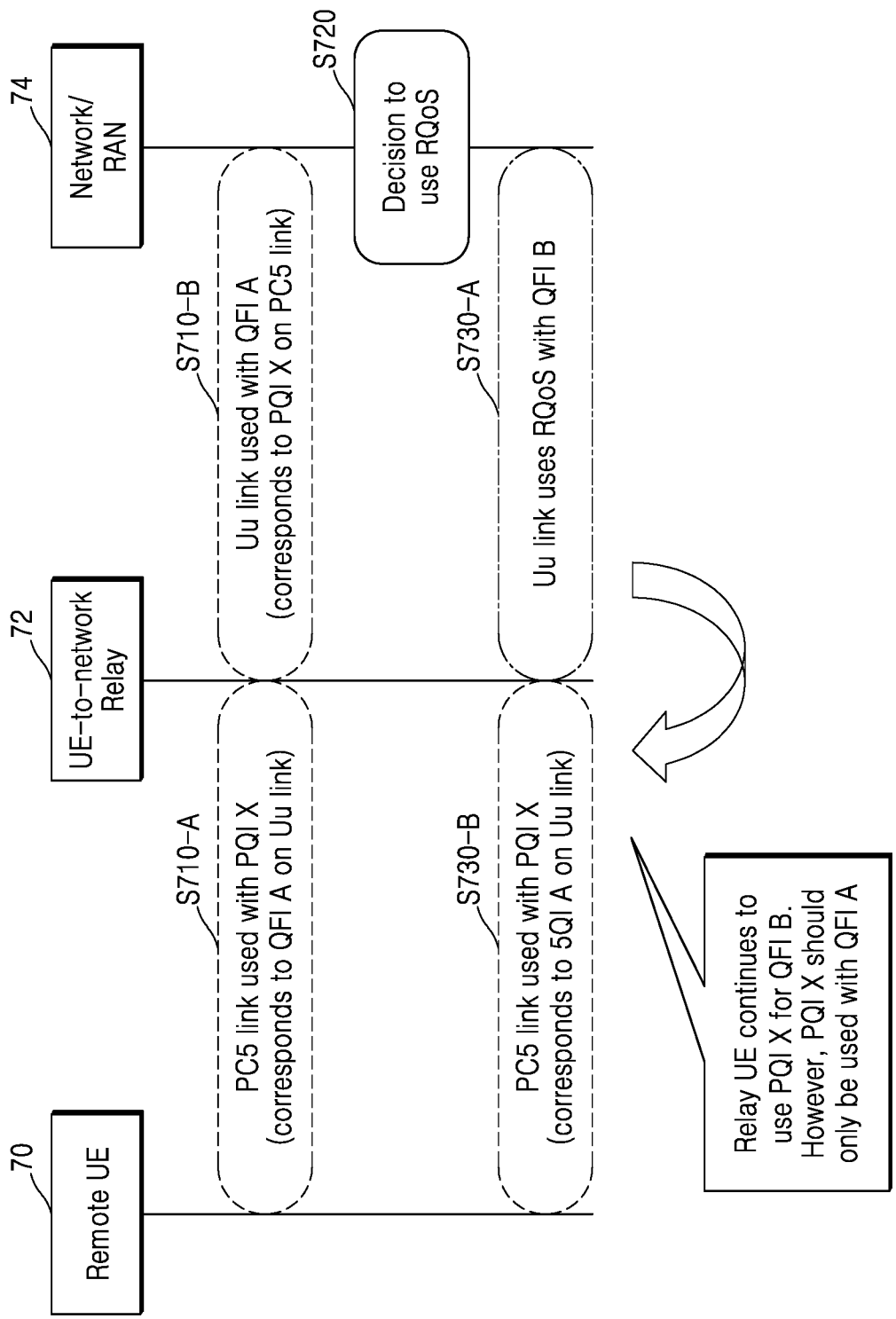
FIG. 7 is a diagram for explaining a problem associated with certain techniques according to an embodiment of the disclosure.

FIG. 7 is a diagram for explaining a problem associated with certain techniques according to an embodiment of the disclosure.

The following summarizes various techniques provided by some embodiments of the disclosure to address certain problems associated with related techniques. The skilled person will appreciate that the disclosure is not limited to the following examples.

1. Referring to FIG. 7, a remote UE (which is out of coverage of the network) can use a UE-to-network relay (which is in coverage of a network) to access and use a PDU session.

(a) The link between the remote UE and relay UE is the PC5 link. The link between the UE-to-network relay and the network is the Uu interface.

(b) When providing a service to a remote UE, it is desired to ensure that the QoS of the session is supported end-to-end, i.e., the QoS of the PC5 link (referred to as PQI) has to correspond to the QoS of the Uu link (referred to as the 5QI (or QFI)).

2. QoS rules can be either a signaled QoS rule or a derived QoS rule. A derived QoS rule is used when reflective QoS (RQoS) is used by the network.

(a) RQoS enables the network and the UE to apply different QoS handling (i.e., by using a different QFI) "on the fly," i.e., without being signaled over NAS protocol.

(b) For example, the network may decide to change the QFI of a downlink flow from QFI A to QFI B, and furthermore indicate that the UE should also use QFI B for the uplink direction:

i. To apply RQoS, the network sends a downlink packet and sets the RQI bit to indicate that RQoS should be used by the UE. The network also indicates the QFI to be used (e.g., QFI B).

ii. The lower layers in the UE provide the RQoS indication to the NAS along with the QFI of the downlink packet (e.g., QFI B).

iii. The UE (NAS) derives a QoS rule so that the uplink packets will be treated with the QFI that was indicated by the lower layers (e.g., QFI B).

3. RQoS leads to the creation of derived QoS rules in the UE. The derived rules are used for a duration defined by the RQoS timer. When the timer expires, the UE deletes the derived rules and uses the signaled QoS rules that existed.

To understand the problem, assume the following initial situation:

The UE-to-network relay 72 has a PDU session with the network and uses a QoS of "QFI A" to exchange the data with the network 74 for the remote UE 70 (see operation S710-1A in FIG. 7).

The remote UE 70 has a PC5 link with the UE-to-network relay 72 and the QoS is "PQI X" (see operation S710-1B in FIG. 7).

The end-to-end QoS is: <PC5 link QoS><Uu interface QoS>=<PQI X><QFI A> (see operations S710-1A and S710-1B in FIG. 7).

The above assumption means that on the Uu link (between UE-to-network relay 72 and network 74), the packets are using QoS with QFI A.

Correspondingly, the PC5 link (between the remote UE 70 and the UE-to-network relay 72) is using PQI X. This is because PQI X is the best corresponding choice for QFI A.

Therefore, the end-to-end QoS is achieved by <PQI X><QFI A>.

Problem: for the PDU session of the UE-to-network relay 72, the network 74 can decide to use RQoS for a downlink packet (see operation S720 in FIG. 7). For example, the network 74 may decide to apply RQoS for a downlink packet and therefore apply QFI B instead of the existing QFI A (see operation S730-A of FIG. 7). When this happens, the end-to-end QoS becomes <PQI X><QFI B> (see operations S730-A and S730-B of FIG. 7).

The problem is that <PQI X> corresponds to <QFI A>, but now for <QFI B> what should the corresponding PQI be, i.e., end-to-end QoS <PQI ?><QFI B>?

To summarize: when RQoS is used on the Uu link such that the QFI is modified, if the UE-to-network relay 72 does not change the PQI, then a true end-to-end QoS may not be possible. A new behavior is required for the UE-to-network relay 72 to determine and implement the end-to-end QoS resulting from RQoS.

Some embodiments of the disclosure may use one or more of the following operations to address the above problem.

1) When the UE-to-Network Relay 72 receives a DL packet with the Reflective QoS Indicator (RQI), the UE-to-Network Relay 72 derives/updates a QoS rule for the remote UE 70 for the UL direction.

2) Based on the new QFI on the Uu due to RQoS, if there exists a PC5 for which the PC5 QoS corresponds to the new QFI (from RQoS), the UE-to-Network Relay 72 performs L2 Link Modification procedure to move the DL traffic on the PC5 QoS flow whose PQI matches the new QFI.

3) Based on the new QFI on the Uu due to RQoS, if there is no PC5 link for which the PC5 QoS corresponds to the new QFI (from RQoS), the UE-to-Network Relay 72 determines the new PQI based on the new QFI.

4) When a new PQI is determined for a new QFI, the UE-to-Network Relay 72 uses the L2 Link Modification procedure to setup a new PC5 QoS flow with the determined PQI.

5) When the derived QoS rule is deleted e.g., after the RQoS timer expires, the UE-to-Network Relay 72 uses the signaled QoS rule for the Uu link. The UE-to-Network Relay 72 performs the L2 Link Modification procedure again so that the QoS for the PC5 QoS flow will again match the QFI of the signaled QoS rule.

Operation 1 above corresponds to operation S630 of FIG. 6. Operation 3 above corresponds to operation S640 of FIG. 6. Operation 2 above corresponds to operation S650 of FIG. 6. Operation 4 above also corresponds to operation S650 of FIG. 6. Operation 5 above corresponds to operations similar to operation S650 of FIG. 6; in examples of the disclosure a procedure corresponding to Operation 4 above can be used for the situation of operation S above.

Referring to FIG. 4, reflective QoS control over Uu as defined in TS 23.501, clause 5.6.5.3 can be leveraged for dynamic QoS handling of Remote UE 70 to save on signaling between SMF and 5G ProSe Layer-3 UE-to-Network Relay. Upon reception of a DL packet with RQI on the Uu for the remote UE 70, based on the indicated QFI, the 5G ProSe UE-to-Network Relay 72 creates a new derived QoS rule or updates existing derived QoS rule corresponding to the remote UE 70, as defined in TS 23.501. The derived QoS rule is for UL packets from the remote UE 70 at Uu interface.

Based on signaled QoS rules (via SMF) or derived QoS rules (Uplink Uu via reflective QoS), the 5G ProSe UE-to-Network Relay 72 may use the L2 Link Modification procedures as defined in TS 23.304 (V1.0.0) clause 6.4.3.4 to either update existing PC5 QoS flow or to set up a new PC5 QoS flow (when the QFI to PC5 QoS flow mapping does not exist).

When the 5G ProSe UE-to-Network relay deletes the derived QoS rule e.g., after the RQ Timer expires, the 5G ProSe UE-to-Network Relay may perform L2 Link Modification procedures defined in TS 23.304 (V1.0.0) clause 6.4.3.4 accordingly using the PQI mapped from the 5QI of the currently used QoS rule after the deletion of the derived QoS rule(s).

Some embodiments of the disclosure provide a method for supporting end-to-end (e2e) Quality of Service (QoS) for uplink (UL) communication between a User Equipment (UE) (e.g. a remote UE) and a network (e.g. 5GC) via a relay node (e.g. a relay UE), the method performed by the relay node and comprising: receiving, from the network (e.g. from RAN), a downlink (DL) packet for the UE, wherein the DL packet includes a value of a first indicator (e.g. a QFI) of a QoS flow on a first link (e.g. Uu) between the relay node and the network; and creating or updating a QoS rule (e.g. a derived QoS rule), wherein the QoS rule is derived based on the value of the first indicator, and optionally wherein the created or updated QoS rule corresponds to the UE or to a QoS flow on a second link (e.g. a first PC5 link) with the UE.

In some embodiments, the method may further comprise determining a value of a second indicator (e.g., PFI) of a QoS flow on a link with the UE, wherein the determined value of the second indicator may correspond to the received value of the first indicator (e.g., to satisfy a certain e2e QoS requirement).

In some embodiments, the method may further comprise, if there exists a QoS flow on a third link (e.g., a second PC5 link) with the UE for which the QoS corresponds to the determined value of the second indicator, performing a procedure (e.g., L2 Link Modification procedure) to move DL traffic on the second link to the existing QoS flow.

In some embodiments, the method may further comprise, if there does not exists a QoS flow for which the QoS corresponds to the determined value of the second indicator, performing a procedure (e.g., L2 Link Modification procedure) to create a new QoS flow on a third link (e.g., PC5 link) with the UE for DL traffic with the determined value of the second indicator.

In some embodiments, performing the procedure may comprise transmitting a message to the UE including the determined value of the second indicator.

In some embodiments, performing the procedure may comprise indicating to the UE a service (e.g., ProSe service) that is associated with the second link and/or the third link (e.g., a service associated with the second link before the procedure and associated with the third link after the procedure when the service moves from the second link to the third link).

In some embodiments, the value of the second indicator may be determined based on a predetermined mapping between values of the first indicator and values of the second indicator.

In some embodiments, the packet may include a third indicator (e.g., RQI) having a value indicating that QoS treatment for the UL should reflect the QoS treatment for the DL (e.g., that Reflective QoS should be used).

In some embodiments, the UE and the relay node may support Proximity Services (ProSe).

In some embodiments, the QoS rule may be a derived QoS rule corresponding to the UE for UL packets.

In some embodiments, the method may further comprise deleting the QoS rule.

In some embodiments, the method may further comprise starting a timer (e.g., time T3583) when the QoS rule is created or updated, wherein the QoS rule may be deleted when the timer expires.

In some embodiments, the method may further comprise, when the QoS rule has been deleted: applying a signaled QoS rule for the first link; and determining a second value of the second indicator (e.g., PFI) of the QoS flow on a link with the UE, wherein the determined second value of the second indicator may correspond to a value of the first indicator associated with the signaled QoS rule.

In some embodiments, the method may further comprise performing a procedure (e.g., L2 Link Modification procedure) to move DL traffic on the second link to an existing QoS flow on a fourth link (e.g., a third PC5 link) with the UE for which the QoS corresponds to the determined second value of the second indicator.

In some embodiments, the method may further comprise performing a procedure (e.g., L2 Link Modification procedure) to create a new QoS flow on a fourth link with the UE for DL traffic with the determined second value of the second indicator.

In some embodiments, performing the procedure may comprise indicating to the UE a service (e.g., ProSe service) that is associated with at least one of the second link or the fourth link (e.g., a service associated with the second link before the procedure and associated with the fourth link after the procedure when the service moves from the second link to the fourth link).

Some embodiments of the disclosure provide a relay node configured to operate according to a method of any aspect, example, embodiment and/or claim disclosed herein.

Some embodiments of the disclosure provide a network (or wireless communication system) comprising a relay node according to the preceding example and a UE.

Some embodiments of the disclosure provide a computer program comprising instructions which, when the program is executed by a computer or processor, cause the computer or processor to carry out a method of any aspect, example, embodiment and/or claim disclosed herein.

Some embodiments of the disclosure provide a computer or processor-readable data carrier having stored thereon a computer program according to the preceding example.

Figure 8:
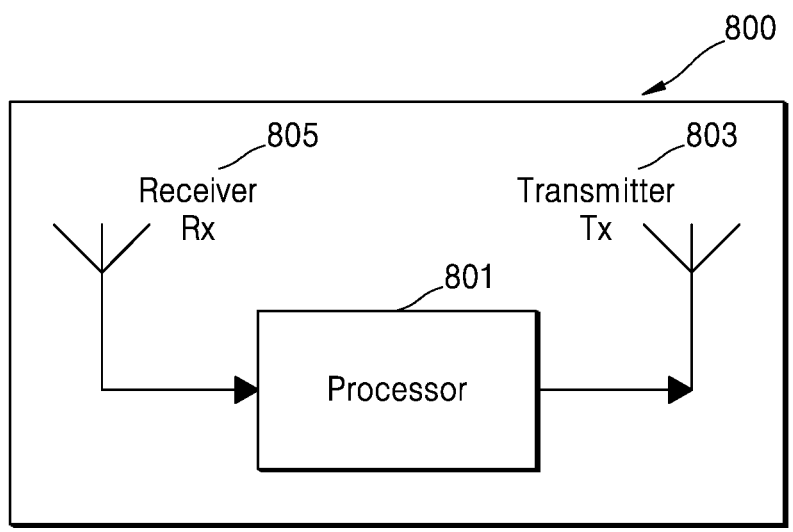
FIG. 8 schematically illustrates a network entity according to an embodiment of the disclosure.

FIG. 8 schematically illustrates a network entity according to an embodiment of the disclosure.

Referring to FIG. 8, it is a block diagram of a network entity that may be used in examples of the disclosure. The skilled person will appreciate that the network entity illustrated in FIG. 8 may be implemented, for example, as a network element on a dedicated hardware, as a software instance running on a dedicated hardware, or as a virtualized function instantiated on an appropriate platform, e.g., on a cloud infrastructure.

The entity 800 comprises a processor (or controller) 801, a transmitter 803 and a receiver 805. The receiver 805 is configured for receiving one or more messages or signals from one or more other network entities. The transmitter 803 is configured for transmitting one or more messages or signals to one or more other network entities. The processor 801 is configured for performing one or more operations and/or functions as described above.

Figure 9:
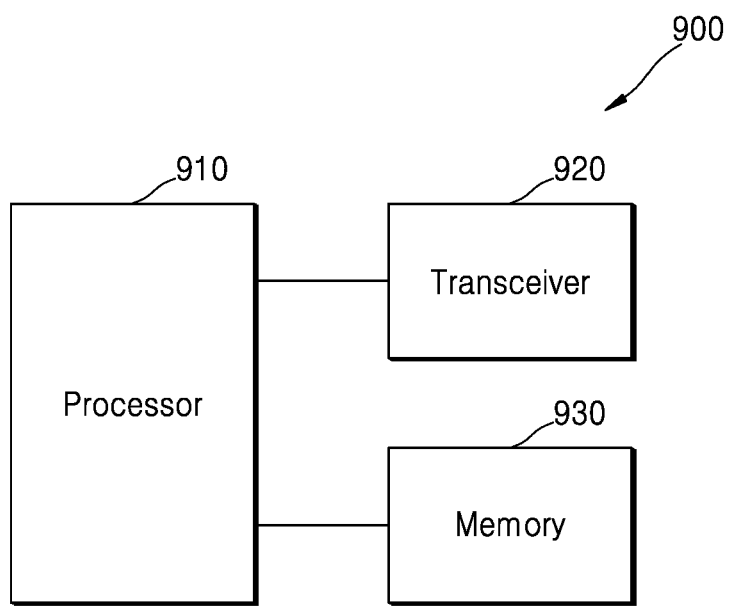
FIG. 9 schematically illustrates a base station (BS) according to an embodiment of the disclosure.

FIG. 9 schematically illustrates a Base station according to an embodiment of the disclosure.

Referring to the FIG. 9, the Base station 900 may include a processor 910, a transceiver 920 and a memory 930. However, all of the illustrated components are not essential. The Base station 900 may be implemented by more or less components than those illustrated in FIG. 9. In addition, the processor 910 and the transceiver 920 and the memory 930 may be implemented as a single chip according to another embodiment.

The aforementioned components will now be described in detail.

The processor 910 may include one or more processors or other processing devices that control the proposed function, process, and/or method. Operation of the Base station 900 may be implemented by the processor 910.

The transceiver 920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store the control information or the data included in a signal obtained by the Base station 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

In an embodiment, the processor 910 configured to generate indication information related to a power control parameter set of a channel for transmitting data with a first priority and transmit the indication information to a User Equipment (UE).

Figure 10:
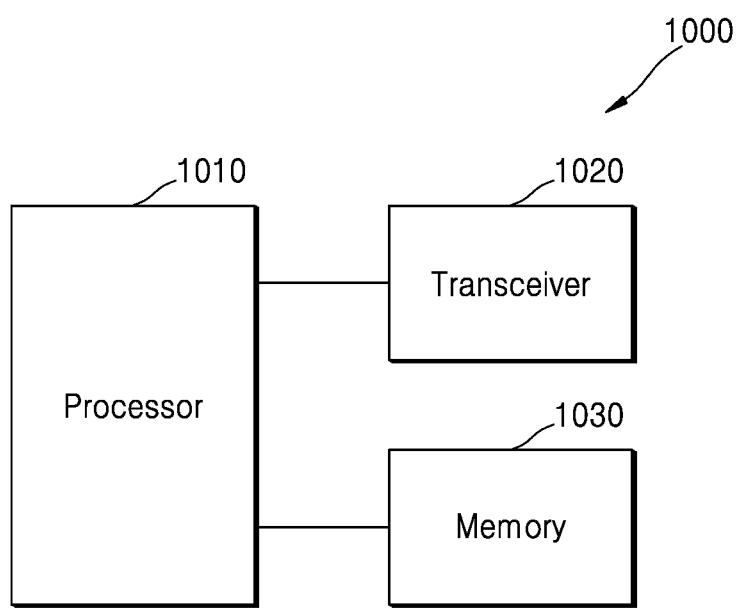
FIG. 10 illustrates a UE according to an embodiment of the disclosure.

FIG. 10 illustrates a user equipment (UE) according to an embodiment of the disclosure.

The UE 1000 may be the remote UE 60, the relay UE 62, the remote UE 70, or UE-to-network relay 72.

Referring to the FIG. 10, the UE 1000 may include a processor 1010, a transceiver 1020 and a memory 1030. However, all of the illustrated components are not essential. The UE 1000 may be implemented by more or less components than those illustrated in FIG. 10. In addition, the processor 1010 and the transceiver 1020 and the memory 1030 may be implemented as a single chip according to another embodiment.

The aforementioned components will now be described in detail.

The processor 1010 may include one or more processors or other processing devices that control the proposed function, process, and/or method. Operation of the UE 1000 may be implemented by the processor 1010.

The transceiver 1020 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1020 may be connected to the processor 1010 and transmit and/or receive a signal. The signal may include control information and data. In addition, the transceiver 1020 may receive the signal through a wireless channel and output the signal to the processor 1010. The transceiver 1020 may transmit a signal output from the processor 1010 through the wireless channel.

The memory 1030 may store the control information or the data included in a signal obtained by the UE 1000. The memory 1030 may be connected to the processor 1010 and store at least one instruction or a protocol or a parameter for the proposed function, process, and/or method. The memory 1030 may include read-only memory (ROM) and/or random access memory (RAM) and/or hard disk and/or CD-ROM and/or DVD and/or other storage devices.

The techniques described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method operations for implementing the techniques described herein. For example, an operation/function of X may be performed by a module configured to perform X (or an X-module). The one or more elements may be implemented in the form of hardware, software, or any combination of hardware and software.

It will be appreciated that examples of the disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement some embodiments of the disclosure. Accordingly, some embodiments provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

While the disclosure has been shown and described with reference to some embodiments, it will be understood by those skilled in the art that various changes in form and detail may be made therein without departing from the scope of the disclosure, as defined by any appended claims.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, operations in the flows, measures and solutions already discussed in the application may be alternated, changed, combined or deleted. Further, the operations, methods, other operations in the flows, measures and solutions already discussed in the application may also be alternated, changed, rearranged, decomposed, combined or deleted. Further, prior arts having the operations, methods, the operations in the flows, measures and solutions already discussed in the application may also be alternated, changed, rearranged, decomposed, combined or deleted.

The above is only a part of the embodiments of the application, and it should be noted that those skilled in the art may also make several improvements and retouchings without departing from the principles of the application. It should be considered as the scope of protection of the application.

The methods according to the embodiments of the disclosure, which are described in the claims or the specification, may be implemented as hardware, software, or a combination of hardware and software.

When implemented as software, a non-transitory computer-readable storage medium storing one or more programs (software modules) may be provided. One or more programs stored in the non-transitory computer-readable storage medium are configured to be executable by one or more processors in an electronic device. One or more programs include instructions that cause the electronic device to execute the methods according to the embodiments of the disclosure, which are described in the claims or the specification of the disclosure.

One or more programs (software modules, software, etc.) may be stored in random access memory (RAM), non-volatile memory including flash memory, read-only memory (ROM), electrically erasable programmable read only memory (EEPROM), magnetic disc storage device, compact disc-ROM (CD-ROM), digital versatile disc (DVD), other types of optical storage devices, or magnetic cassette. Alternatively, one or more programs may be stored in a memory provided by a combination of all or part of these devices. Also, each memory may include a plurality of configured memories.

Also, one or more programs may be stored in an attachable storage device that is accessible through a communication network such as Internet, intranet, local area network (LAN), wide area network (WAN), or storage area network (SAN), or communication network provided by a combination thereof. These storage devices may be connected through an external port to a device that performs the embodiments of the disclosure. Also, a separate storage on the communication network may access the device that performs the embodiment of the disclosure.

According to various embodiments of the disclosure, the method of efficiently transmitting and receiving the reference signal in the wireless communication system may be provided.

The technical problems to be solved by the disclosure are not limited to those described above, and other technical problems not described herein will be clearly understood by those of ordinary skill in the art from the following description.

In specific embodiments of the disclosure, the elements included in the disclosure have been expressed in the singular or plural form according to the suggested specific embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of performing a quality of service (QoS) control by a relay user equipment (UE), the method comprising:
   receiving, from a radio access network (RAN), a downlink (DL) packet with a reflective QoS indication (RQI) and a QoS flow identifier (QFI), for a remote UE;
   based on the RQI, creating a derived QoS rule using the received QFI;
   creating a derived PC5 QoS rule for the remote UE, based on the derived QoS rule;
   based on the derived PC5 QoS rule, determining a PC5 5G QoS identifier (PQI) mapped to a 5G QoS identifier (5QI) on Uu interface between the RAN and the relay UE; and
   transmitting, to the remote UE, a link modification request message including the determined PQI.

2. The method of claim 1, wherein, in case that there is a PC5 QoS flow with the determined PQI, the PC5 QoS flow with the determined PQI is modified, based on the link modification request message.

3. The method of claim 1, wherein, in case that there is no PC5 QoS flow with the determined PQI, a PC5 QoS flow with the determined PQI is established, based on the link modification request message.

4. The method of claim 1, further comprising:
   in case that the derived QoS rule is deleted after an expiry of a reflective QoS (RQoS) timer, transmitting, to the remote UE, a link modification request message including a new PQI mapped to a new 5QI of a configured QoS rule.

5. A method of performing a quality of service (QoS) control by a remote user equipment (UE), the method comprising:
   in case that based on a derived PC5 QoS rule, a PC5 5G QoS identifier (PQI) mapped to a 5G QoS identifier (5QI) on Uu interface between a radio access network (RAN) and a relay UE is determined receiving, from the relay UE, a link modification request message including the determined PQI; and
   transmitting an uplink packet, based on the derived PC5 QoS rule,
   wherein in case that a downlink (DL) packet with a reflective QoS indication (RQI) and a QoS flow identifier (QFI) is received at the relay UE from the RAN for the remote UE, based on the RQI, a derived QoS rule is created using the received QFI at the relay UE, and
   the derived PC5 QoS rule is created based on the derived QoS rule at the relay UE.

6. The method of claim 5,
   wherein, in case that there is a PC5 QoS flow with the determined PQI, the PC5 QoS flow with the determined PQI is modified, based on the link modification request message, and
   wherein, in case that there is no PC5 QoS flow with the determined PQI, the PC5 QoS flow with the determined PQI is established, based on the link modification request message.

7. The method of claim 5, further comprising:
   in case that the derived QoS rule is deleted after an expiry of a reflective QoS (RQoS) timer, receiving, from the relay UE, a link modification request message including a new PQI mapped to a new 5QI of a configured QoS rule.

8. A relay user equipment (UE) of performing a quality of service (QoS) control, the relay UE comprising:
   a transceiver; and
   at least one processor coupled with the transceiver and configured to:
   receive, from a radio access network (RAN), a downlink (DL) packet with a reflective QoS indication (RQI) and a QoS flow identifier (QFI), for a remote UE,
   based on the RQI, create a derived QoS rule using the received QFI,
   creating a derived PC5 QoS rule for the remote UE, based on the derived QoS rule,
   based on the derived PC5 QoS rule, determine a PC5 5G QoS identifier (PQI) mapped to a 5G QoS identifier (5QI) on Uu interface between the RAN and the relay UE, and
   transmit, to the remote UE, a link modification request message including the determined PQI.

9. The relay UE of claim 8, wherein, in case that there is a PC5 QoS flow with the determined PQI, the PC5 QoS flow with the determined PQI is modified, based on the link modification request message.

10. The relay UE of claim 8, wherein, in case that there is no PC5 QoS flow with the determined PQI, a PC5 QoS flow with the determined PQI is established, based on the link modification request message.

11. The relay UE of claim 8, wherein the at least one processor is further configured to:
   in case that the derived QoS rule is deleted after an expiry of a reflective QoS (RQoS) timer, transmit, to the remote UE, a link modification request message including a new PQI mapped to a new 5QI of a configured QoS rule.

12. A remote user equipment (UE) of performing a quality of service (QoS) control, the remote UE comprising:
   a transceiver; and
   at least one processor coupled with the transceiver and configured to:
   in case that based on a derived PC5 QoS rule, a PC5 5G QoS identifier (PQI) mapped to a 5G QoS identifier (5QI) on Uu interface between a radio access network (RAN) and a relay UE is determined, receive, from the relay UE, a link modification request message including the determined PQI, and
   transmit an uplink packet, based on the derived PC5 QoS rule,
   wherein in case that a downlink (DL) packet with a reflective QoS indication (RQI) and a QoS flow identifier (QFI) is received at the relay UE from the RAN for the remote UE, based on the RQI, a derived QoS rule is created using the received QFI at the relay UE, and
   the derived PC5 QoS rule is created based on the derived QoS rule at the relay UE.

13. The remote UE of claim 12, wherein in case that there is a PC5 QoS flow with the determined PQI, the PC5 QoS flow with the determined PQI is modified, based on the link modification request message.

14. The remote UE of claim 12, wherein in case that there is no PC5 QoS flow with the determined PQI, a PC5 QoS flow with the determined PQI is established, based on the link modification request message.

15. The remote UE of claim 12, wherein the at least one processor is further configured to:
   in case that the derived QoS rule is deleted after an expiry of a reflective QoS (RQoS) timer, receive, from the relay UE, a link modification request message including a new PQI mapped to a new 5QI of a configured QoS rule.

\* \* \* \* \*